United States Patent
Biskeborn et al.

(10) Patent No.: US 10,068,590 B2
(45) Date of Patent: Sep. 4, 2018

(54) METHOD OF MAKING MAGNETICALLY SHIELDED WRITE TRANSDUCERS

(71) Applicant: International Business Machines Corporation, Armonk, NY (US)

(72) Inventors: Robert G. Biskeborn, Hollister, CA (US); Philipp Herget, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1579 days.

(21) Appl. No.: 13/691,648

(22) Filed: Nov. 30, 2012

(65) Prior Publication Data

US 2013/0086799 A1 Apr. 11, 2013

Related U.S. Application Data

(63) Continuation of application No. 12/578,233, filed on Oct. 13, 2009, now Pat. No. 8,358,486.

(51) Int. Cl.
*G11B 5/115* (2006.01)
*G11B 5/008* (2006.01)

(52) U.S. Cl.
CPC ............ *G11B 5/115* (2013.01); *G11B 5/0083* (2013.01); *Y10T 29/49021* (2015.01)

(58) Field of Classification Search
CPC .. G11B 5/11–5/115; G11B 5/29; G11B 5/295; G11B 5/00826; G11B 5/0083; G11B 5/315; Y10T 29/49021
See application file for complete search history.

(56) References Cited

U.S. PATENT DOCUMENTS

| | | | |
|---|---|---|---|
| 3,610,839 A * | 10/1971 | Sand | G11B 5/10 360/129 |
| 3,969,771 A * | 7/1976 | Suzuki | G11B 5/11 360/121 |
| 4,263,633 A | 4/1981 | Yamada et al. | |
| 4,424,542 A | 1/1984 | Ujihara et al. | |
| 4,663,836 A | 5/1987 | Bakker | |
| 5,033,184 A | 7/1991 | Tandai et al. | |
| 5,063,469 A | 11/1991 | Tandai | |
| 5,996,213 A | 12/1999 | Shen et al. | |
| 8,358,486 B2 | 1/2013 | Biskeborn et al. | |
| 2005/0174689 A1 | 8/2005 | Ozue et al. | |
| 2005/0237665 A1 | 10/2005 | Guan et al. | |
| 2006/0012907 A1* | 1/2006 | Ozue | G11B 15/6656 360/64 |

(Continued)

OTHER PUBLICATIONS

Biskeborn et al. U.S. Appl. No. 12/578,233, filed Oct. 13, 2009.

(Continued)

*Primary Examiner* — Livius R Cazan
(74) *Attorney, Agent, or Firm* — Zilka-Kotab, P.C.

(57) ABSTRACT

A method according to one embodiment includes forming a lower shield of a shield structure; forming a portion of a magnetic yoke for each of at least two write transducers above the lower shield of the shield structure; and forming an upper shield of the shield structure above the portions of the yokes of each of two of the at least two write transducers, the shields being formed of a magnetically permeable material, wherein the upper and lower shields are magnetically connected.

17 Claims, 8 Drawing Sheets

(56) References Cited

U.S. PATENT DOCUMENTS

2006/0092566 A1    5/2006   Ho et al.
2006/0245108 A1   11/2006   Hsu et al.
2008/0151436 A1    6/2008   Sato et al.
2011/0085265 A1    4/2011   Biskeborn et al.

OTHER PUBLICATIONS

Non-Final Office Action from U.S. Appl. No. 12/578,233 dated Dec. 23, 2011.
Final Office Action from U.S. Appl. No. 12/578,233 dated Jun. 6, 2012.
Notice of Allowance and Fee(s) Due from U.S. Appl. No. 12/578,233 dated Sep. 17, 2012.
Biskeborn et al., "Hard-disk-drive technology flat heads for linear tape recording," IBM Journal of Research and Development, vol. 47, Issue 4, Jun. 2003, pp. 385-400.
Biskeborn et al., U.S. Appl. No. 15/982,857, filed May 17, 2018.

\* cited by examiner

METHOD OF MAKING MAGNETICALLY SHIELDED WRITE TRANSDUCERS

RELATED APPLICATIONS

This application is a continuation of U.S. patent application Ser. No. 12/578,233 filed Oct. 13, 2009, which is herein incorporated by reference.

BACKGROUND

The present invention relates to data storage systems, and more particularly, this invention relates to magnetically shielded write transducers and systems implementing the same.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed, where multiple writers operate at the same time to write data to the tape. However, as the spacing between the writers becomes smaller and smaller, problems, such as crosstalk, bit flipping, etc., tend to emerge more frequently.

Crosstalk is a phenomenon that occurs when two adjacent writers perform writing operations at about the same time. Particularly, crosstalk is present where the written portion for a first writer is affected by the magnetic flux created by an adjacent second writer, thereby degrading or otherwise adversely affecting the written information from the first writer. The writers do not need to be active simultaneously; crosstalk may emerge even upon performing writing operations within a few nanoseconds of each other, depending on the write gap of the particular head being used.

It would be favorable to reduce or eliminate crosstalk between adjacent write transducers to improve writing operation efficiency and accuracy.

SUMMARY

A method according to one embodiment includes forming a lower shield of a shield structure; forming a portion of a magnetic yoke for each of at least two write transducers above the lower shield of the shield structure; and forming an upper shield of the shield structure above the portions of the yokes of each of two of the at least two write transducers, the shields being formed of a magnetically permeable material, wherein the upper and lower shields are magnetically connected.

A method according to another embodiment includes forming at least two write transducers for writing to a magnetic medium, the at least two write transducers being positioned adjacent each other and aligned along a line; and forming a shield structure having shields adjacent at least three sides of each of the at least two write transducers, the shields being formed of a magnetically permeable material.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof. Particularly, head structures are disclosed that include a shield structure that provides at least some magnetic shielding to neighboring write transducers, thereby reducing the effects of crosstalk from neighboring writers. In various approaches disclosed herein, the shield structures may be above and below a write transducer (including a portion thereof), between adjacent write transducers (including a portion thereof), behind a write transducer (including a portion thereof), and combinations thereof.

In one general embodiment, a magnetic head includes at least two write transducers for writing to a magnetic medium; and a shield structure having at least two magnetically connected shields which at least partially cover two opposite sides of the writer. By "magnetically connected," what is meant is that there is a low reluctance path between the connected parts.

In another general embodiment, a magnetic head includes at least two write transducers for writing to a magnetic medium, the at least two write transducers being positioned adjacent each other and aligned along a line; and a shield structure having shields adjacent at least three sides of each of the at least two write transducers, the shields being formed of a magnetically permeable material.

In another general embodiment, a method includes forming a lower shield of a shield structure; forming a portion of a magnetic yoke for each of at least two write transducers above the lower shield of the shield structure; and forming an upper shield of the shield structure above the portions of the magnetic yokes of each of two of the at least two write transducers, the shields being formed of a magnetically permeable material, wherein the upper and lower shields are magnetically connected. The upper and/or lower shields may each be comprised of separate sections formed above and/or below each individual yoke portion, may be a continuous layer extending across the two (or more) yoke portions, etc.

Figure 1:
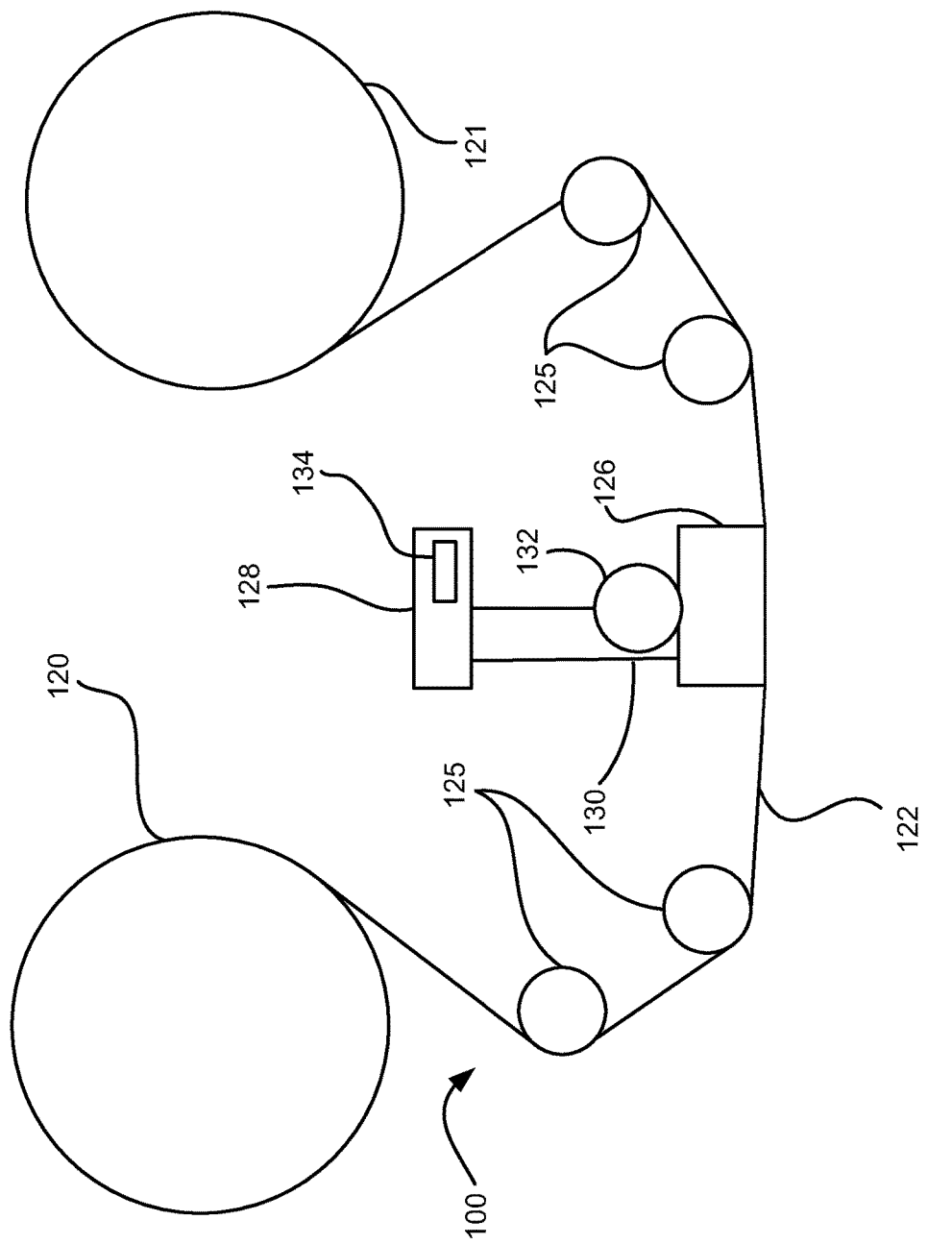
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
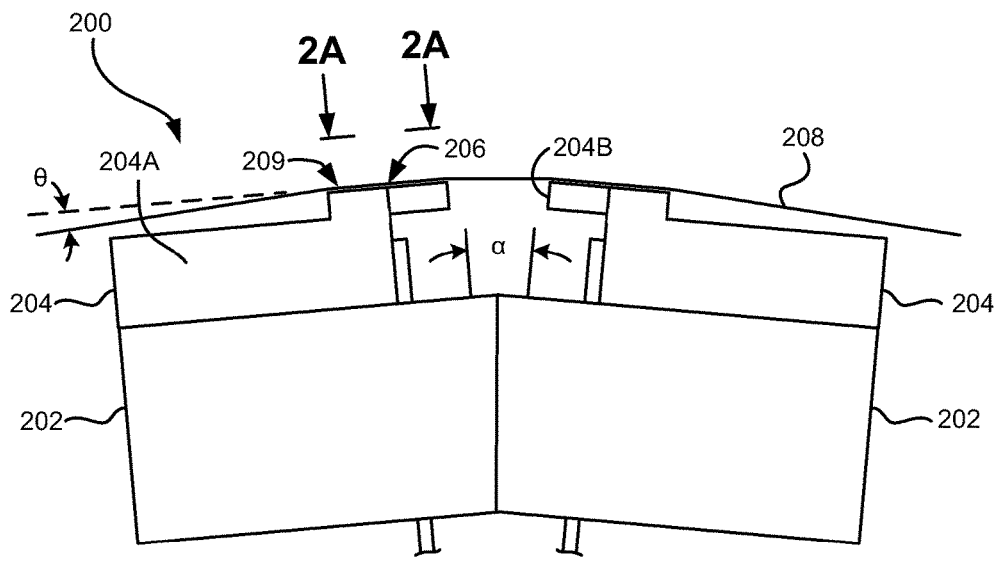
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap comprising readers and/or writers 206 situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
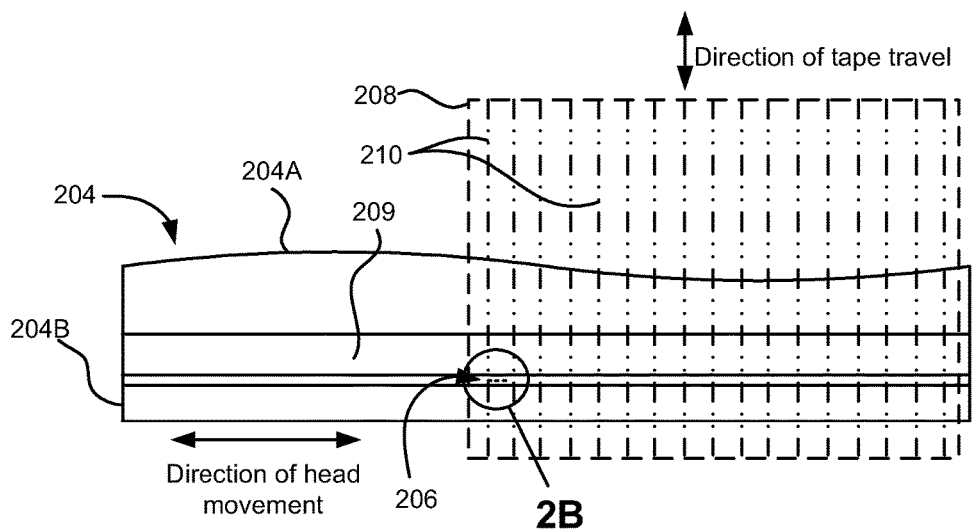
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4-22 data bands, e.g., with 16 data bands and 17 servo tracks 210, as shown in FIG. 2A on a one-half inch wide tape 208. The data bands are defined between servo tracks 210. Each data band may include a number of data tracks, for example 96 data tracks (not shown). During read/write operations, the elements 206 are positioned within one of the data bands. Outer readers, sometimes called servo readers, read the servo tracks 210. The servo signals are in turn used to keep the elements 206 aligned with a particular track during the read/write operations.

Figure 2B:
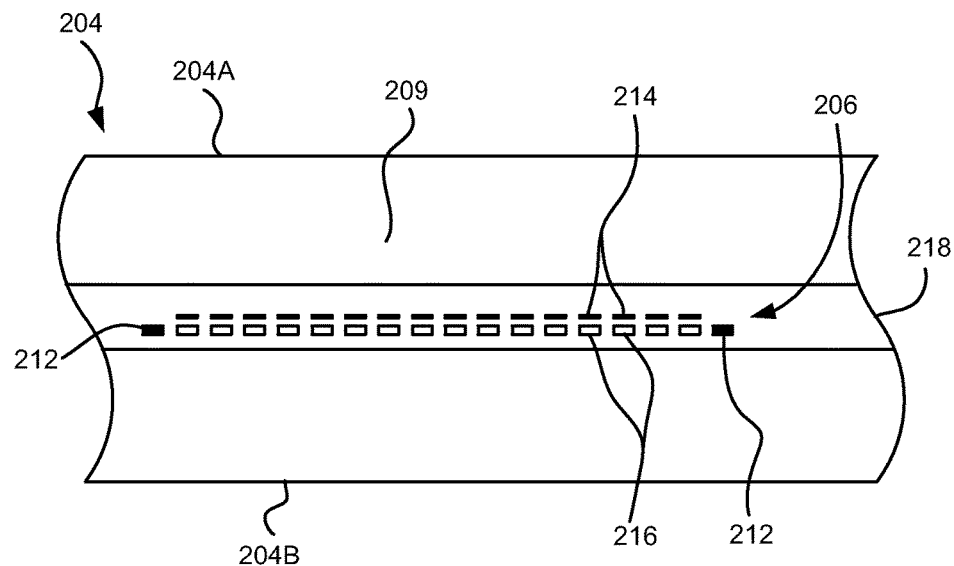
FIG. 2B is a detailed view taken from Circle 2B of FIG. 2A.

FIG. 2B depicts a plurality of read and/or write elements 206 formed in a gap 218 on the module 204 in Circle 2B of FIG. 2A. As shown, the array of elements 206 includes, for example, 16 writers 214, 16 readers 216 and two servo readers 212, though the number of elements may vary. Illustrative embodiments include 8, 16, 32, and 64 elements per array 206. A preferred embodiment includes 32 readers per array and/or 32 writers per array. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of elements 206 may be readers or writers only, and the arrays may contain one or more servo readers 212. As noted by considering FIGS. 2 and 2A-B together, each module 204 may include a complementary set of elements 206 for such things as bi-directional reading and writing, read-while-write capability, backward compatibility, etc.

Figure 2C:
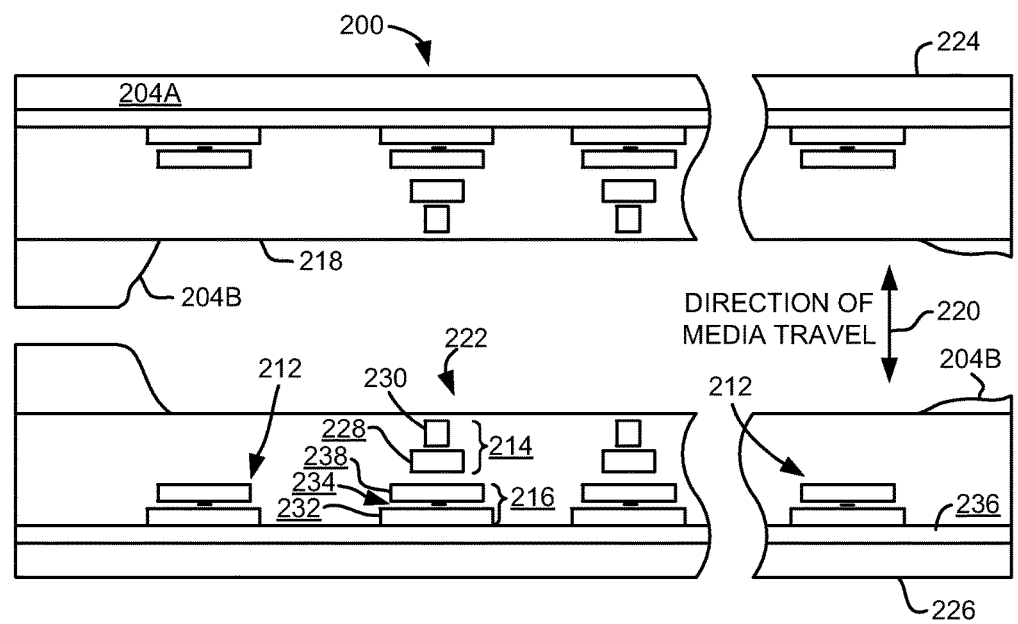
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

In some embodiments, each writer may be shielded from external sources of magnetic flux by a high permeability shield, as shown in FIGS. 3A-3G. The dimensions shown in FIGS. 3A-3G are exemplary only, and are not meant to limit the invention in any way. The shield above and below each writer effectively prevents each writer from being affected by the fields which are produced from neighboring writers. This reduces, and in many cases substantially eliminates, writer-to-writer crosstalk. A shield positioned additionally or alternatively between neighboring writers may also be present to provide and/or enhance the shielding effect.

Figure 3A:
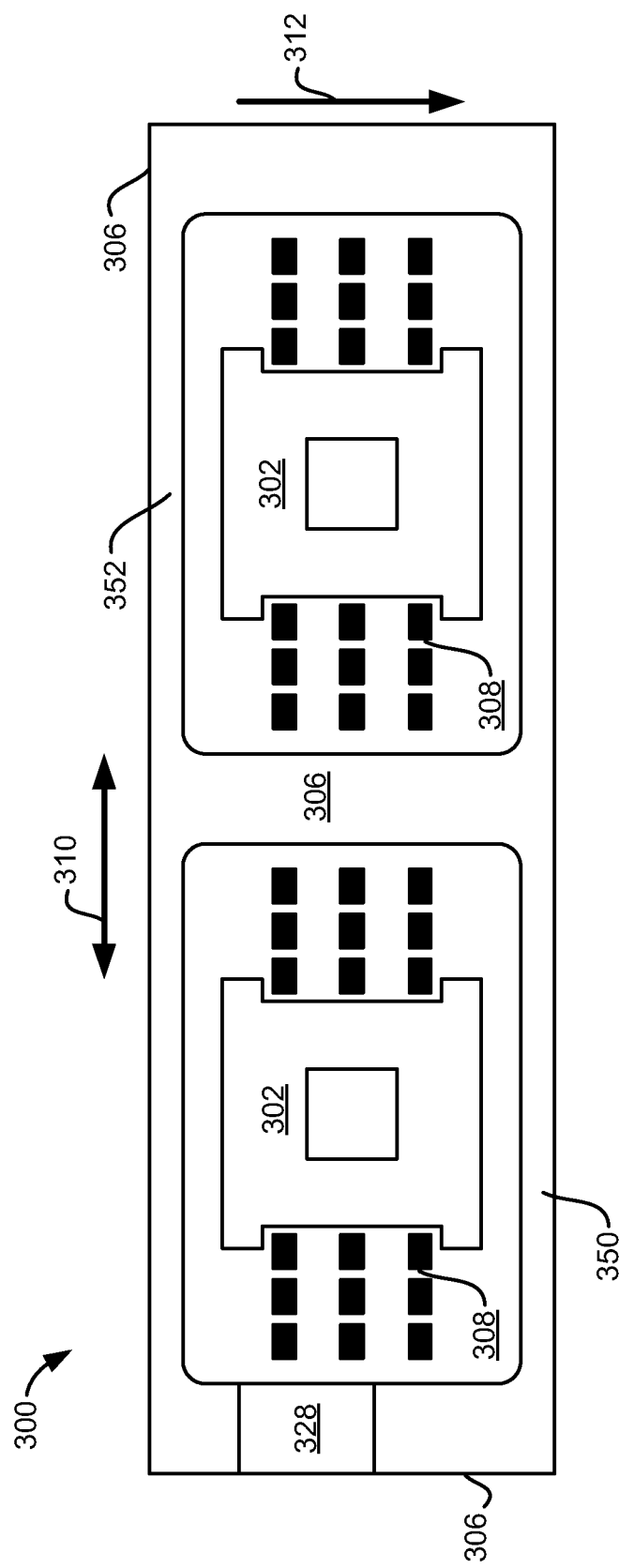
FIG. 3A shows a cross sectional view of a portion of a magnetic head along a parallel plane of the media facing side, according to one embodiment.
Figure 3B:
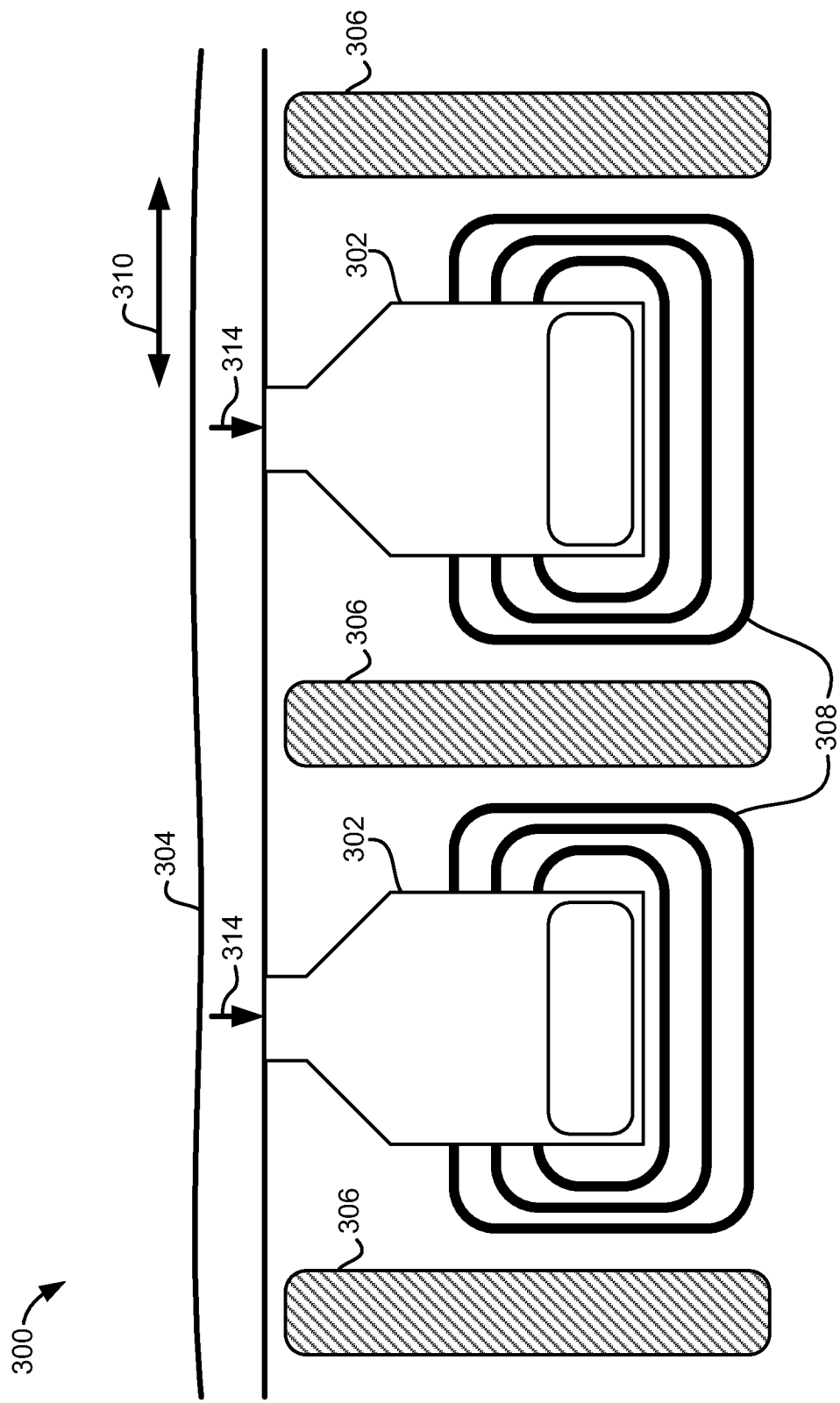
FIG. 3B shows a cross section of a portion of a magnetic head in plane with the wafer, according to one embodiment.
Figure 3C:
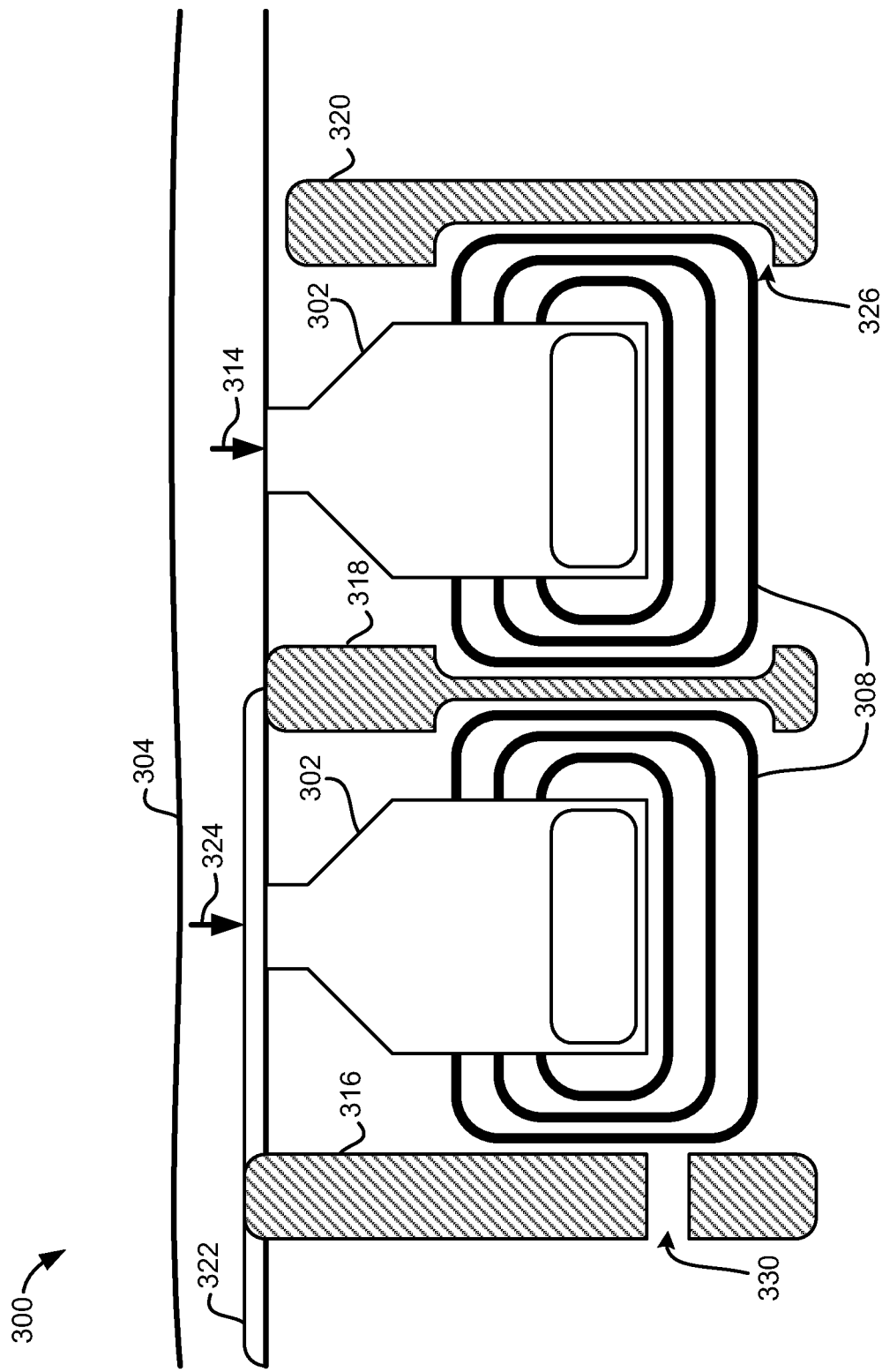
FIG. 3C shows a cross section of a portion of a magnetic head in plane with the wafer, according to one embodiment.
Figure 3D:
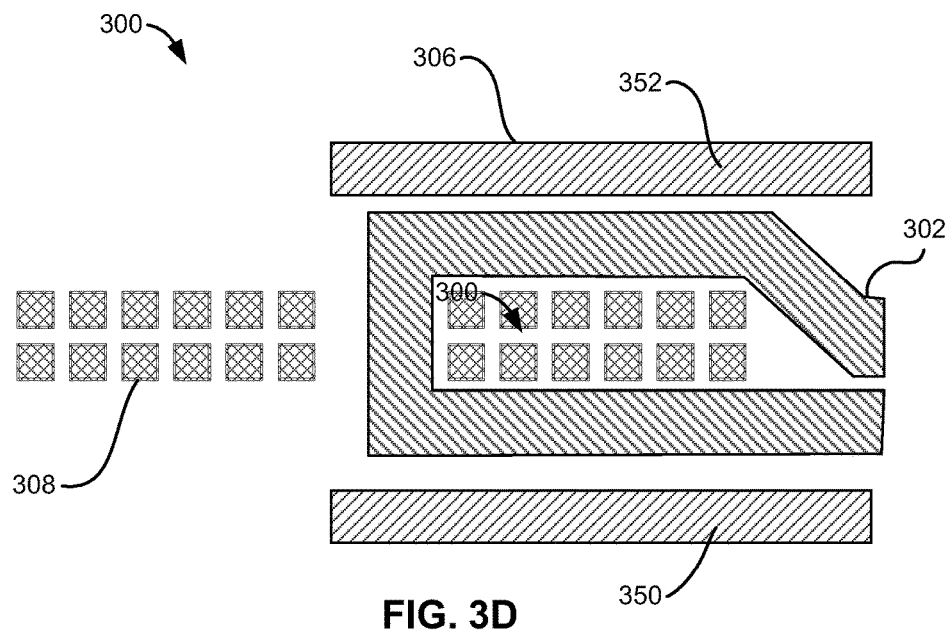
FIG. 3D is a cross sectional view of a portion of a magnetic head taken perpendicular to the media facing side of the head and perpendicular to the plane with the wafer according to one embodiment.
Figure 3E:
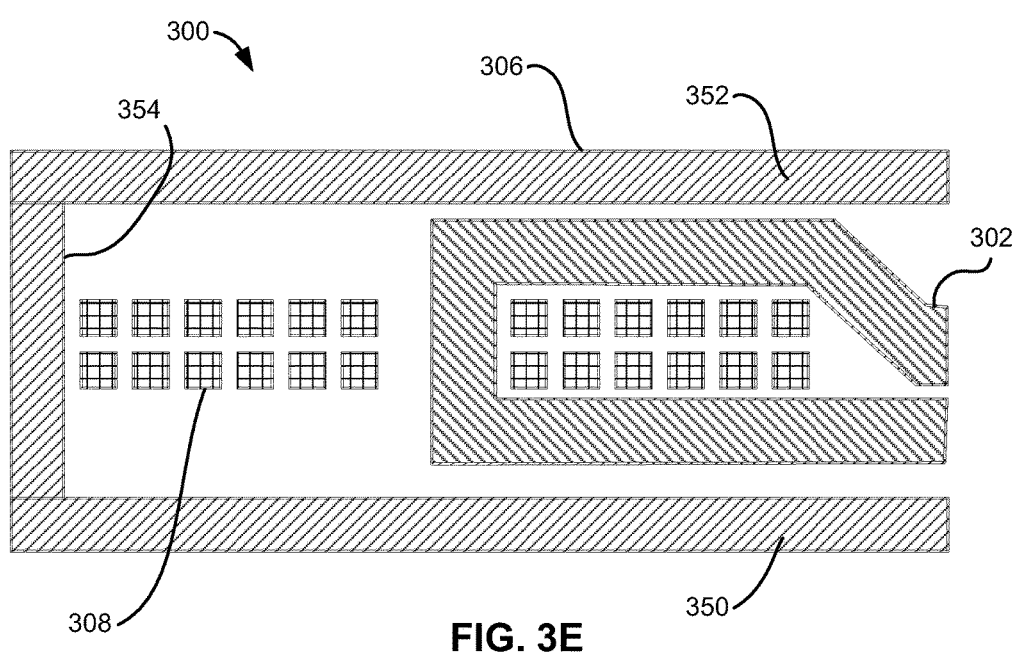
FIG. 3E is a cross sectional view of a portion of a magnetic head taken perpendicular to the media facing side of the head and perpendicular to the plane with the wafer according to one embodiment.
Figure 3F:
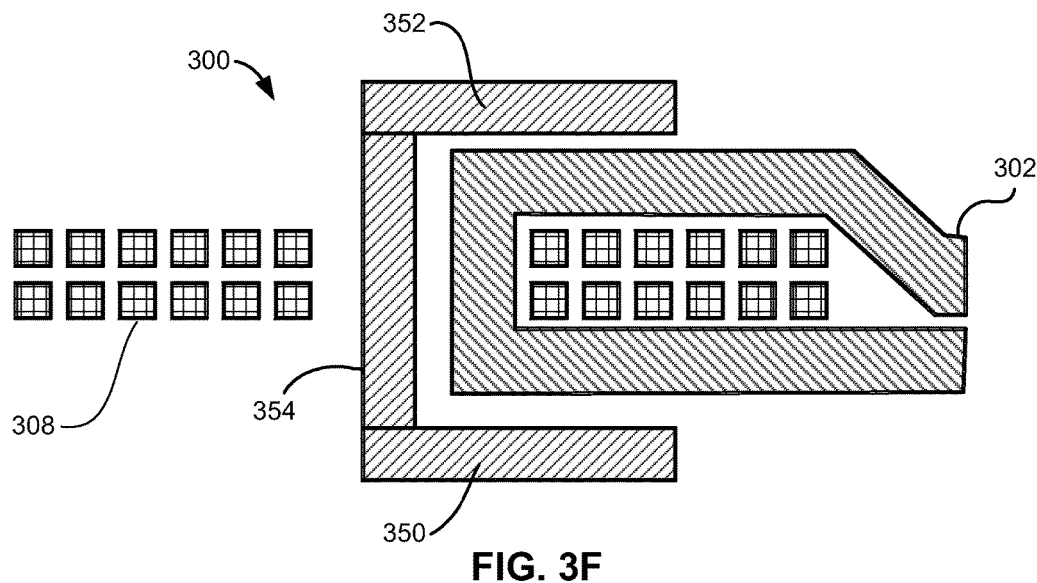
FIG. 3F is a cross sectional view of a portion of a magnetic head taken perpendicular to the media facing side of the head and perpendicular to the plane with the wafer according to one embodiment.
Figure 3G:
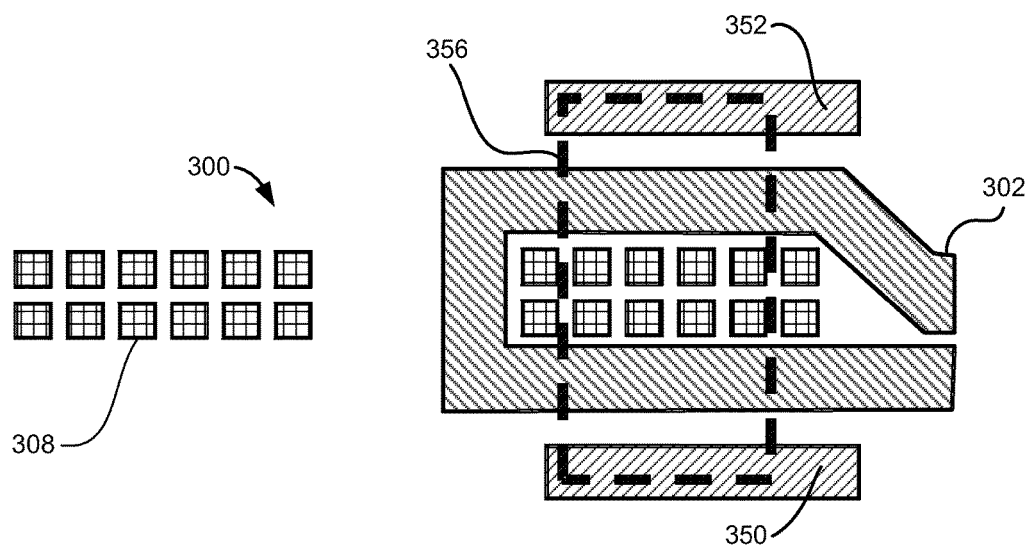
FIG. 3G is a cross sectional view of a portion of a magnetic head taken perpendicular to the media facing side of the head and perpendicular to the plane with the wafer according to one embodiment.

FIG. 3A is a cross sectional view of a portion of a magnetic head 300 taken along a parallel plane of the media facing side of the head according to one embodiment. FIG. 3B is a cross sectional view in plane with the wafer of a portion of a magnetic head 300 in plane with the wafer according to one embodiment. FIG. 3C is a cross sectional view of a portion of a magnetic head 300 in plane with the wafer showing multiple embodiments. FIG. 3D is a cross sectional view of a portion of a magnetic head 300 taken perpendicular to the media facing side of the head and perpendicular to the plane with the wafer according to one embodiment. FIG. 3E is a cross sectional view of a portion of a magnetic head 300 taken perpendicular to the media facing side of the head and perpendicular to the plane with the wafer according to one embodiment. FIG. 3F is a cross sectional view of a portion of a magnetic head 300 taken perpendicular to the media facing side of the head and perpendicular to the plane with the wafer according to one embodiment. FIG. 3G is a cross sectional view of a portion of a magnetic head 300 taken perpendicular to the media facing side of the head and perpendicular to the plane with the wafer according to one embodiment.

Now referring to FIGS. 3A-3B, according to some embodiments, a magnetic head 300 may comprise at least two write transducers 302 for writing to a magnetic medium 304. Examples of magnetic media include magnetic tapes, hard disks, etc. The entire magnetic head 300 is not pictured in FIG. 3A, and the magnetic head may also comprise any other components commonly found on magnetic heads as would be known to one of skill in the art, such as read transducers, insulative layers, coatings, etc. In addition, the magnetic head 300 may include a shield structure 306 having at least two magnetically connected shields which at least partially cover two opposite sides of the writer. In some approaches, the shield structure 306 has shields adjacent at least three sides of each of the at least two write transducers 302. In any embodiment, the shields may be formed of a magnetically permeable material such as CoFe, NiFe, etc.

In some embodiments, the at least two write transducers 302 may be positioned adjacent each other and may be aligned along a line 310 oriented generally perpendicular to a direction of travel of the magnetic medium 304 thereacross, where the direction of tape travel thereacross is into or out of the page of FIG. 3B. For example, in FIG. 3A, arrow 312 depicts a tape travel direction that is perpendicular to the generally aligned at least two write transducers 302.

In some more embodiments, one of the shields of the shield structure 306 may be a common shield between an adjacent two of the at least two write transducers 302. This may simplify the process of producing the magnetic head 300. In alternative embodiments, none of the shields of the shield structure 306 may be a common shield between an adjacent two of the at least two write transducers 302.

In a preferred embodiment, the shield structure 306 may have shields adjacent four sides of at least one of the write transducers 302, as shown in FIG. 3B. This may provide for more effective shielding between the write transducers 302, thus more thoroughly eliminating the possibility of crosstalk between the write transducers 302.

In some additional embodiments, the shield structure 306 may have shields adjacent five sides of at least one of the write transducers 302, e.g., the shield structure may be a box with a back shield. Note that the back shield, or any other shield of the structure, may have a cutout for electrical leads.

In even more embodiments, the at least two write transducers 302 may have a media facing side, as indicated in FIG. 3B as arrows 314 (e.g., typically the transducers 302 will have ends of the pole tips towards or at the tape bearing surface of the head 300), wherein at least some of the shields are recessed from a plane extending across the media facing side of the write transducers 302. As can be seen in FIG. 3B, the shield structure 306 shields do not extend all the way to the upper surface of the magnetic head 300.

In alternative embodiments, referring to FIG. 3C, the at least two write transducers 302 may have a media facing side, as indicated by arrows 314 and 324 (e.g., typically the transducers 302 will have ends of the pole tips towards or at the tape bearing surface of the head 300), wherein at least some of the shield structure shields abut (as shown by shield structure shield 318) or traverse a plane extending across the media facing side of the write transducers 302 (as shown by shield structure shield 316). Also, in some embodiments, a layer 322, possibly comprised of a hard material such as diamond-like carbon (DLC), may reside above the plane extending across the media facing side of the write transducers 302.

With continued reference to FIG. 3C, in some embodiments, the write transducers 302 may include write coils 308, wherein at least one of the shields of the shield structure (as shown by shield structure shield 320) includes a cutout 326 for one of the write coils 308. In some more embodiments, a shield structure may include more than one cutout 326, possibly on opposite facing shields (as shown by shield structure shield 318), such that write coils 308 may extend into the cutouts from both sides of the shield structure shield 318.

With reference to FIG. 3A, in more embodiments, at least one of the shield structure shields 306 may have an insulative interruption 328 therein. The insulative interrupt 328 may be comprised of a different material from the shield structure 306, such as $Al_2O_3$, or any other insulative material known to one of skill in the relevant art.

Referring to FIGS. 3D-3G, the shield structure 306 may include a lower shield 350 and an upper shield 352. Note that the shield structure 306 may or may not include vertical sidewalls, as shown in FIG. 3A. The upper and/or lower shields may extend about to the media facing side of the head, as shown in FIG. 3E, may be recessed slightly therefrom as shown in FIG. 3D, or recessed therefrom by a larger extent as in FIGS. 3F and 3G. The lower shield 350 and/or upper shield 352 may extend into or beyond the media facing side in yet other approaches.

The upper and lower shields 350, 352 are preferably magnetically connected. As shown in FIG. 3A, a sidewall of the shield structure 306 may provide the magnetic connection. Referring to FIGS. 3E and 3F, the magnetic connection may be provided by a rear portion 354, preferably of a magnetic material, and which may itself provide some shielding effect. Any other known mechanism of providing a magnetic connection between the various portions of the shield structure 306 may be used, as represented by box 356 in FIG. 3G.

With continued reference to FIGS. 3A-3G, a method may be described for forming shield structures with write transducers, according to one embodiment. The method may be carried out in any desired environment, and may be a portion of a larger method which forms portions of the rest of a magnetic head.

Referring to FIG. 3B, according to one embodiment, a lower shield 350 of a shield structure 306 is formed. A portion of a magnetic yoke 302 is formed above the lower shield 350 of the shield structure for each of at least two write transducers. An upper shield 352 of the shield structure is formed above the portions of the yokes of each of two of the at least two write transducers, the shields being formed of a magnetically permeable material. The upper and lower shields are magnetically connected by any suitable mechanism, including a via, a wall (as shown), etc.

The upper and/or lower shields may be a continuous layer extending across the two (or more) yoke portions as shown in FIG. 3B. In another approach, the upper and/or lower sections may each be comprised of separate segments formed above and/or below each individual yoke portion. An individual segment above or below a yoke portion of one write transducer may be magnetically connected to a segment above or below the yoke portion of an adjacent write transducer. Additional approaches are also possible.

Also, note that while the drawings show a "pancake" type coil, the coil of the write transducer could be a helical, or "barbershop pole," configuration.

According to another embodiment, with reference to FIGS. 3A-3G, a portion of a magnetic yoke may be formed for each of at least two write transducers 302. While forming the portion of the magnetic yokes, a portion of a shield structure 306 may be formed having at least one side shield between two of the at least two write transducers 302, the shields being formed of a magnetically permeable material such as CoFe, NiFe, etc. Of course, any of the various embodiments described above in reference to FIGS. 3A-3G may be implemented in the method of forming the write transducers and shield structure.

In some embodiments, the shield structure 306 may have alternate designs, such as a box (with four sides), a box having a common shield with a neighboring box, individual boxes separated from each other by a layer (such as an insulative layer), a three-shielded structure (with the shields between the write transducers 302), a box enclosed except for the top portion and cutouts 330 for electrical leads.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   forming a lower shield of a shield structure;
   forming a portion of a magnetic yoke for each of at least two write transducers above the lower shield of the shield structure; and
   forming an upper shield of the shield structure above the portions of the yokes of each of two of the at least two write transducers,
   the shields being formed of a magnetically permeable material,
   wherein the upper and lower shields are magnetically connected,
   wherein the at least two write transducers are positioned adjacent each other and aligned along a line oriented generally perpendicular to a direction of travel of a magnetic medium thereacross when the write transducers are in use.

2. A method as recited in claim 1, wherein one of the shields of the shield structure is a common shield between an immediately adjacent two of the at least two write transducers.

3. A method as recited in claim 1, wherein the shield structure has shields adjacent five sides of at least one of the write transducers.

4. A method as recited in claim 1, wherein none of the shields of the shield structure is a common shield between an immediately adjacent two of the at least two write transducers.

5. A method as recited in claim 1, wherein the shield structure has shields adjacent four sides of at least one of the write transducers.

6. A method as recited in claim 1, wherein the at least two write transducers have a media-facing side, wherein at least some of the shields are recessed from a plane extending across the media-facing side of the write transducers.

7. A method as recited in claim 1, wherein the at least two write transducers have a media-facing side, wherein at least some of the shields abut or traverse a plane extending across the media-facing side of the write transducers.

8. A method as recited in claim 1, wherein the write transducers include write coils, wherein at least one of the shields of the shield structure includes a cutout for one of the write coils.

9. A method as recited in claim 1, wherein at least one of the shields has an insulative interruption therein.

10. A method as recited in claim 1, wherein the upper and lower shields are magnetically connected by a via of magnetic material.

11. A method as recited in claim 1, wherein at least one of the upper shield and the lower shield is a continuous layer extending across the yokes of the at least two write transducers.

12. A method as recited in claim 1, wherein at least one of the upper shield and the lower shield has separate segments formed above and/or below the yokes of the at least two write transducers.

13. A method as recited in claim 12, wherein the separate segment formed above and/or below the magnetic yoke of one of the at least two write transducers is magnetically connected to the separate segment formed above and/or below the magnetic yoke of an adjacent one of the at least two write transducers.

14. A method as recited in claim 1, wherein the upper and lower shields are directly magnetically connected.

15. A method as recited in claim 1, wherein the at least two write transducers are positioned adjacent each other and aligned along a line oriented substantially perpendicular to a direction of travel of a magnetic medium thereacross when the write transducers are in use.

16. A method, comprising:
forming a lower shield of a shield structure;
forming a portion of a magnetic yoke for each of at least two write transducers above the lower shield of the shield structure; and
forming a thin film coil structure adjacent to the yoke; and
forming an upper shield of the shield structure above the portions of the yokes of each of two of the at least two write transducers,
the shields being formed of a magnetically permeable material,
wherein the upper and lower shields are directly magnetically connected,
wherein the at least two write transducers are positioned adjacent each other and aligned along a line oriented generally perpendicular to a direction of travel of a magnetic medium thereacross when the write transducers are in use.

17. A method as recited in claim 16, wherein one of the shields of the shield structure is a common shield between an immediately adjacent two of the at least two write transducers.

* * * * *